3,330,790
FERRIC DIALKYL DITHIOCARBAMATES USED TO INCREASE THE VULCANIZATION RATE OF MONOOLEFIN-NON-CONJUGATED DIENE TERPOLYMERS
Victor S. Chambers, Naugatuck, Conn., assignor to Uniroyal, Inc., a corporation of New Jersey
No Drawing. Filed May 27, 1964, Ser. No. 370,696
13 Claims. (Cl. 260—23.7)

This invention relates to a method of vulcanizing unsaturated rubbery copolymers of monoolefins and to the vulcanizates obtained thereby. More particularly the invention relates to the sulfur cure of an interpolymer of at least two monoolefins and a copolymerizable diene, using as an accelerator a ferric dialkyldithiocarbamate in which the alkyl radical contains from 1 to 4 carbon atoms.

Unsaturated olefin copolymer rubbers such as ethylene-propylene-dicyclopentadiene terpolymer rubber prepared by solution polymerization with coordination-type catalysts have many desirable qualities, including the ability to be vulcanized with sulfur. However, it is unfortunate that the sulfur cure of such terpolymers is not as rapid as would be desired for some purpose, even when various known accelerators are employed. Thus, zinc dimethyldithiocarbamate for example does not produce a desirably high rate of sulfur cure of ethylene-propylene-diene terpolymer, even through that accelerator is capable of producing an ample rate of cure in the more conconventional sulfur-curable rubbers. Even when zinc dimethyldithiocarbamate is used along with other accelerators such as mercaptobenzothiazole the sulfur cure of ethylene-propylene-diene terpolymer rubber is not as rapid as would be desired.

I am aware of such prior disclosures as those in U.S. Patents 1,386,153, 1,440,962, 1,440,963, 1,513,122, 2,283,334, 2,283,336, 2,303,593, 2,236,389 and 2,554,182 but nothing in those patents is suggestive of the present invention.

The present invention is based on the surprising discovery that remarkably high rates of cure are obtainable in the sulfur cure of unsaturated olefin copolymer rubbers by using as an accelerator a ferric dialkyldithiocarbamate of the structure:

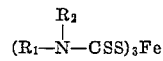

where $R_1$ and $R_2$ area lkyl groups containing from 1 to 4 carbons which may be the same or different (methyl, ethyl, n-propyl, isopropyl, n-butyl, secondary-butyl, iso-butyl and tertiary butyl). This result is particularly unexpected in view of the fact that ferric dimethyldithiocarbamate does not similarly produce a rapid cure in the more conventional sulfur curable rubbers. The uniqueness of the present ferric dialkyldithiocarbamates is further attested to by the fact that numerous other metal dimethyldithiocarbamates, including the cadmium, cobaltous, nickel, cupric, mercuric, chromium (III), arsenic and antimony dimethyldithiocarbamates, do not produce the remarkable increase of speed made possible by ferric dialkyldithiocarbamate.

The sulfur-curable unsaturated elastomers to which the invention is applicable may be described as rubbery interpolymers of at least two (e.g. three or more) alpha-monoolefins (e.g., ethylene, propylene, butene-1, hexene-1, 4-methylpentene-1, 5-methylhexene-1, 4-ethylhexene-1, or similar olefins having the formula $CH_2=CHR$ in which R is hydrogen or a hydrocarbon radical, particularly a saturated alkyl hydrocarbon radical having from 1 to 8 carbon atoms), and at least one (e.g., two or more) copolymerizable diene (ordinarily a non-conjugated diene) such as dicyclopentadiene, methylcyclopentadiene dimer, 1,4-hexadiene, 11-ethyl-1,11-tridecadiene, 1,9-octadecadiene, 1,5-cyclooctadiene, methylene norbornylene, or other suitable dienes such as are disclosed in British Patent 880,904, Dunlop Rubber Co., Oct. 25, 1961, U.S. Patents 2,933,480, Gresham and Hunt, Apr. 19, 1960, and 3,000,866, Tarney, Sept 19, 1961, and Belgian Patents 623,698 and 623,741, Montecatini Feb. 14, 1963; preferred are terpolymers of this kind containing from about 1 to about 25% (more preferably about 2 to about 15%) by weight of dicyclopentadiene or the like. Such sulfur vulcanizable unsaturated interpolymers will hereinafter be referred to as "EPT" elastomer.

In practicing the invention the EPT elastomer is compounded with sulfur (or equivalent sulfur-yielding material) and the described ferric dialkyl dithiocarbamate accelerator. The vulcanizable composition of the invention further includes a long chain-fatty acid (e.g. $C_{10}$ to $C_{20}$) such as stearic acid, lauric acid, palmitic acid, oleic acid or equivalent acids and a metal oxide such as zinc oxide or the like. If desired these may be supplied in the form of a metal salt of a long-chain fatty acid, e.g., zinc stearate, zinc oleate, zinc laurate, and the like. A preferred form of the invention contemplates in addition a secondary accelerator, such as a thiazole or thiazole derivative, e.g., 2-mercaptobenzothiazole, metal salts of 2-mercaptobenzothiazole, e.g., the zinc salt, 2-benzothioazolyl disulfide, and 2-benzothiazolesulfenamides. The amounts of these ingredients are not critical and may be in accordance with conventional practice in the accelerated sulfur vulcanization of rubbers. It may be stated that in general the amounts of the ingredients will usually fall the following ranges:

| | Parts by Weight | |
| --- | --- | --- |
| | Broad Range | Preferred Range |
| EPT elastomer | 100 | 100. |
| Ferric dialkyldithiocarbamate | 0.1 to 5 | 0.5 to 2.5. |
| Sulfur | 0.1 to 10 | 0.5 to 5. |
| Long-chain fatty acid | 1.0 to 5 | 1.0 to 3. |
| Metal oxide | 0.2 to 5* | 0.5 to 3. |
| Thiazole-type accelerator | 0 to 2 | 0.5 to 1.5. |

* Large quantities may be employed when it is desired to use the metal oxide as a filler.

However, larger or smaller quantities that those shown may be used if desired.

The vulcanizable composition of the invention in practice frequently contains other ingredients in addition. Thus, fillers are particularly useful, especially reinforcing fillers such as carbon black, silica, lignin, and the like. The filler may amount to from 0 to 500 parts or more per 100 of EPT, preferably 0 to 300 parts. If desired the EPT-filler mix may be subjected to low hysteresis processing, for example by hot milling with conventional promoters, prior to compounding for vulcanization.

Oil extenders or similar plasticizers or softeners represent a particularly useful additional ingredient. Various oils, asphalts, resins and the like may be used for this purpose, in amounts of for example from 0 to 300 or more parts per 100 of EPT with the higher amounts of softener being used in stocks containing relatively large amounts of any filler. Usually between 0 and 100 parts of softener are used.

The extender and/or filler (as well as the other ingredients) may be masterbatched, at least in part, in the solution or "cement" in which the elastomer is originally prepared, if desired, or these ingredients may be Banbury or mill mixed. Usually the zinc oxide, stearic acid, carbon black and softener oil are blended with the polymer in a Banbury and then the sulfur and accelerators added to this mix on a cool mill.

Various conventional antioxidants or similar auxiliary compounding ingredients may be included in the mix if desired.

The compounded EPT may be shaped in any suitable desired conventional manner such as molding, extruding, calendering, and the like, and it may if desired be combined with reinforcing structures such as fabric, wire, etc., for example in the manufacture of tires, footwear, coated fabrics, and the like.

In order to bring about the vulcanization, the mix is subjected to heat, ordinarily in a closed mold (although an open or oven cure may also be employed in appropriate cases). The vulcanization conditions may be the same as in conventional practice, although it will be understood that the invention permits a given level of cure to be attained more easily or more expeditiously than in conventional practice. The time and temperature of cure will of course vary with such factors as the degree of cure desired, the particular polymer employed, the amount of vulcanizing ingredients present, the size of the article, the character of the heating device, etc. The time and temperature of cure are in general inversely related. Usually satisfactory results are obtainable within a temperature range of from 250° to 400° F. and within time periods of from one minute to two or more hours.

Ferric dialkyldithiocarbamates may be made in known manner by adding an aqueous solution of ferric chloride to an aqueous solution of the sodium dialkyldithiocarbamate. A preferred practice involving the use of approximately 10% excess of the sodium dialkyldithiocarbamate as disclosed in British Patent 692,063 (5/27/1953) to Monsanto, gives a more stable ferric compound.

The following examples, in which all quantities are expressed by weight, will serve to illustrate the practice of the invention in more detail. The EPT used in the examples is an ethylene-propylene-dicyclopentadiene terpolymer containing 35–45% propylene and approximately 6% diene (calculated from the iodine number) with the balance being ethylene.

*Example 1*

This example describes the use of ferric dimethyldithiocarbamate as an accelerator and compares the cures obtained with it with those obtained with zinc dimethyldithiocarbamate or tetramethyl thiuram monosulfide are used. A masterbatch was prepared by mixing in a Banbury 100 parts of EPT having a Mooney viscosity of approximately 145, 50 parts of high abrasion furnace carbon black, 5 parts of zinc oxide, 1 part of stearic acid, and 25 parts of a naphthenic softener oil. Portions of this were then used to prepare the following stocks, the mixing being done on a mill heated at 120° F. (the amounts are all in parts by weight):

| Stock | A | B | C |
|---|---|---|---|
| Masterbatch | 181 | 181 | 181 |
| Sulfur | 1.5 | 1.5 | 1.5 |
| Mercaptobenzothiazole | 0.5 | 0.5 | 0.5 |
| Ferric dimethyldithiocarbamate | 1.5 | | |
| Zinc dimethyldithiocarbamate | | 1.5 | |
| Tetramethylthiuram monosulfide | | | 1.5 |
| Mooney Scorch at 270° F.: | | | |
| Scorch time, minutes | 8.0 | 12.5 | 19.0 |
| Cure rate, minutes | 6.0 | 12.75 | 13.5 |

These stocks were cured at 292° F. and 320° F. The results obtained are summarized in Table I below:

TABLE I

| | Mins. Cured | Stock A | Stock B | Stock C |
|---|---|---|---|---|
| Cured at 292° F.: | | | | |
| 300% modulus, p.s.i | 15 | 700 | 380 | 420 |
| | 30 | 1,180 | 650 | 960 |
| | 45 | 1,350 | 980 | 1,180 |
| Tensile, p.s.i | 15 | 2,190 | 790 | 1,220 |
| | 30 | 2,950 | 2,170 | 2,980 |
| | 45 | 3,220 | 3,180 | 3,380 |
| Elongation, percent | 15 | 635 | 595 | 655 |
| | 30 | 535 | 675 | 615 |
| | 45 | 535 | 615 | 570 |
| Cured at 320° F.: | | | | |
| 300% modulus p.s.i | 5 | 450 | 240 | 220 |
| | 10 | 900 | 580 | 640 |
| | 15 | 1,130 | 880 | 890 |
| Tensile, p.s.i | 5 | 1,720 | 820 | 490 |
| | 10 | 3,200 | 2,300 | 2,850 |
| | 15 | 3,100 | 3,270 | 3,200 |
| Elongation, percent | 5 | 670 | 620 | 615 |
| | 10 | 635 | 685 | 700 |
| | 15 | 540 | 650 | 610 |

These results show that when ferric dimethyldithiocarbamate is used as the primary accelerator a high tensile is obtained much more rapidly than when zinc dimethyldithiocarbamate or tetramethylthiuram monosulfide is used. This faster cure rate is particularly valuable in the manufacture of molded goods with relatively thin cross section where the curing cycle can be drastically shortened and a much higher productivity obtained from the expensive molding equipment.

*Example 2*

The procedure described in Example 1 was repeated except that the terpolymer used had a Mooney viscosity of approximately 60 rather than approximately 145 as was the case in Example 1. The softener oil was omitted in the preparation of the masterbatch and the compounding was completed on a cool mill as follows:

| Stock | D | E |
|---|---|---|
| Masterbatch | 156 | 156 |
| Sulfur | 1.5 | 1.5 |
| Mercaptobenzothiazole | 0.5 | 0.5 |
| Ferric dimethyldithiocarbamate | 1.5 | |
| Tetramethylthiuram monosulfide | | 1.5 |
| Mooney viscosity of compounded stock | 88 | 81 |
| Mooney scorch at 270° F.: | | |
| Scorch time, minutes | 6.0 | 11.5 |
| Cure rate, minutes | 4.75 | 8.0 |

These stocks were cured at 320° F. and 400° F. The results are summarized in the table below:

TABLE II

| | Mins. cured | Stock D | Stock E |
|---|---|---|---|
| Cured at 320° F.: | | | |
| 300% modulus, p.s.i | 5 | 640 | 390 |
| | 10 | 1,090 | 1,150 |
| | 15 | 1,450 | 1,580 |
| Tensile, p.s.i | 5 | 1,620 | 910 |
| | 10 | 3,380 | 3,450 |
| | 15 | 3,810 | 3,650 |
| Elongation, percent | 5 | 585 | 625 |
| | 10 | 605 | 610 |
| | 15 | 550 | 515 |
| Cured at 400° F.: | | | |
| 300% modulus, p.s.i | 1 | 650 | 420 |
| | 2 | 1,260 | 1,010 |
| Tensile, p.s.i | 1 | 1,690 | 810 |
| | 2 | 3,480 | 2,970 |
| Elongation, percent | 1 | 600 | 540 |
| | 2 | 590 | 580 |

These results show that the same rapid cure is obtained with ferric dimethyldithiocarbamate in a stock made from lower Mooney viscosity polymer and containing no extender oil.

Example 3

This example shows the effect on the rate of cure of varying the amount of ferric dimethyldithiocarbamate used in an EPT-black stock. A master batch was prepared as described in Example 1 and portions of this were then used to prepare the following stocks, the mixing being done on a mill heated to 120° F.

| Stock | F | G | H | I | J |
|---|---|---|---|---|---|
| Masterbatch | 181 | 181 | 181 | 181 | 181 |
| Sulfur | 1.5 | 1.5 | 1.5 | 1.5 | 1.5 |
| Mercaptobenzothiazole | 0.5 | 0.5 | 0.5 | 0.5 | 0.5 |
| Ferric dimethyldithiocarbamate | 0.5 | 1.0 | 1.5 | 2.0 | 5.0 |

These stocks were cured at 320° F. The results are given in the table below.

| | Mins. cured | Stock F | Stock G | Stock H | Stock I | Stock J |
|---|---|---|---|---|---|---|
| 300% modulus, p.s.i. | 5 | 220 | 360 | 490 | 590 | 440 |
|  | 10 | 530 | 820 | 1,160 | 1,320 | 990 |
|  | 15 | 730 | 980 | 1,360 | 1,490 | 1,190 |
| Tensile, p.s.i. | 5 | 410 | 920 | 1,370 | 1,840 | 1,350 |
|  | 10 | 1,390 | 3,000 | 3,160 | 3,230 | 2,870 |
|  | 15 | 2,320 | 3,380 | 3,390 | 2,910 | 2,930 |
| Elongation, percent | 5 | 560 | 650 | 620 | 630 | 620 |
|  | 10 | 610 | 690 | 580 | 570 | 610 |
|  | 15 | 640 | 640 | 550 | 460 | 530 |

These results show that a satisfactory cure can be obtained with as little as 0.5 part of the ferric dimethyldithiocarbamate and that the optimum amount is approximately 1.5 to 2.0 parts.

Example 4

This example shows the effect of using zero, 0.5, 1.0, and 1.5 parts of mercaptobenzothiazole with the 1.5 parts of ferric dimethyldithiocarbamate as the accelerator system. A masterbatch was prepared as described in Example 1 and portions of this were mixed on a 120° F. mill to prepare the following stocks.

| Stock | K | H | L | M |
|---|---|---|---|---|
| Masterbatch | 181 | 181 | 181 | 181 |
| Sulfur | 1.5 | 1.5 | 1.5 | 1.5 |
| Mercaptobenzothiazole | None | 0.5 | 1.0 | 1.5 |
| Ferric dimethyldithiocarbamate | 1.5 | 1.5 | 1.5 | 1.5 |

These stocks were cured at 320° F. The results are given in the table below.

| | Mins. cured | Stock K | Stock H | Stock L | Stock M |
|---|---|---|---|---|---|
| 300% modulus, p.s.i. | 5 | 360 | 490 | 460 | 420 |
|  | 10 | 720 | 1,160 | 850 | 850 |
|  | 15 | 960 | 1,360 | 1,270 | 970 |
| Tensile, p.s.i. | 5 | 730 | 1,370 | 1,320 | 1,270 |
|  | 10 | 2,300 | 3,160 | 2,990 | 2,830 |
|  | 15 | 3,040 | 3,390 | 3,400 | 3,180 |
| Elongation, percent | 5 | 530 | 620 | 610 | 650 |
|  | 10 | 640 | 580 | 649 | 630 |
|  | 15 | 600 | 550 | 550 | 610 |

These results show that ferric dimethyldithiocarbamate will give a satisfactory cure when used alone, but that the addition of 0.5 part of mercaptobenzothiazole improves the cure rate.

Example 5

This example shows the effect of varying the amount of zinc oxide. A masterbatch was prepared in a Banbury from 100 parts of EPT similar to that used in Example 1 having a Mooney viscosity of approximately 150, 50 parts of high abrasion furnace black and 30 parts of a naphthenic type softener oil. This was then used to prepare the following stocks the mixing being done on a mill at approximately 120° F.

| Stock | N | O | P | Q | R | S |
|---|---|---|---|---|---|---|
| Masterbatch | 180 | 180 | 180 | 180 | 180 | 180 |
| Zinc oxide | 5 | 4 | 3 | 2 | 1 | none |
| Stearic acid | 1 | 1 | 1 | 1 | 1 | 1 |
| Ferric dimethyldithiocarbamate | 1.5 | 1.5 | 1.5 | 1.5 | 1.5 | |
| Mercaptobenzothiazole | 0.5 | 0.5 | 0.5 | 0.5 | 0.5 | 1.5 |
| Sulfur | 1.5 | 1.5 | 1.5 | 1.5 | 1.5 | 0.5 |
| | | | | | | 1.5 |

Portions of each of these were cured at 274° F., 292° F., 320° F., and 400° F. The results are summarized in the table below:

| | Mins. cured | Stock N | Stock O | Stock P | Stock Q | Stock R | Stock S |
|---|---|---|---|---|---|---|---|
| Cured at 274° F.: Tensile, p.s.i. | 30 | 2,020 | 1,850 | 2,370 | 2,850 | 2,690 | (*) |
| Cured at 292° F.: Tensile, p.s.i. | 15 | 2,500 | 2,400 | 2,430 | 2,580 | 2,430 | 120 |
| Cured at 320° F.: Tensile, p.s.i. | 7.5 | 3,100 | 3,100 | 3,100 | 3,000 | 2,920 | 190 |
| Cured at 400° F.: Tensile, p.s.i. | 2 | 3,600 | 3,550 | 3,470 | 3,000 | 2,870 | 845 |

*No cure.

These data show the benefit of zinc oxide.

Example 6

This example shows the benefit of using stearic acid with the ferric dimethyldithiocarbamate and mercaptobenzothiazole accelerators, using an EPT similar to that used in Example 1, having a Mooney viscosity of approximately 150. Stocks were prepared as described in the table below by mixing the first 5 ingredients in a Banbury and the rest on a mill at about 120° F.

| Stock | T | U | V | W | X | Y |
|---|---|---|---|---|---|---|
| EPT | 100 | 100 | 100 | 100 | 100 | 100 |
| Stearic acid | nil | nil | 0.5 | 0.5 | 1.0 | 1.0 |
| Zinc oxide | 5 | 5 | 5 | 5 | 5 | 5 |
| High abrasion furnace Carbon black | 50 | 50 | 50 | 50 | 50 | 50 |
| Naphthenic type Softener oil | 25 | 25 | 25 | 25 | 25 | 25 |
| Sulfur | 1.5 | 1.5 | 1.5 | 1.5 | 1.5 | 1.5 |
| Mercaptobenzothiazole | 0.5 | 0.5 | 0.5 | 0.5 | 0.5 | 0.5 |
| Tetramethyl thiuram monosulfide | 1.5 | ------ | 1.5 | ------ | 1.5 | ------ |
| Ferric dimethyldithiocarbamate | ------ | 1.5 | ------ | 1.5 | ------ | 1.5 |

Portions of these were cured at 320° F. The results of the tests are summarized in the table below.

| | Mins. cured | Stock T | Stock U | Stock V | Stock W | Stock X | Stock Y |
|---|---|---|---|---|---|---|---|
| 300% modulus, p.s.i. | 5 | 360 | 350 | 260 | 480 | 270 | 560 |
|  | 7.5 | 640 | 580 | 560 | 670 | 590 | 680 |
| Tensile, p.s.i. | 5 | 980 | 1,000 | 730 | 1,850 | 800 | 2,040 |
|  | 7.5 | 2,510 | 2,070 | 2,390 | 2,720 | 2,310 | 2,900 |
| Elongation, Percent | 5 | 610 | 620 | 660 | 690 | 680 | 640 |
|  | 7.5 | 640 | 630 | 690 | 660 | 670 | 650 |

The results show that the ferric dimethyldithiocarbamate gives a faster cure than tetramethylthiuram monosulfide when the stock contains 0.5 or 1.0 part of stearic acid but not when no stearic acid is present.

Example 7

This example shows that, in addition to mercaptobenzothiazole, a number of derivatives of mercaptobenzothiazole are effective as secondary accelerators used with ferric dimethyldithiocarbamate. A masterbatch was prepared in the same way as the one in Example 1 and portions of this were used to prepare the following stocks, the mixing being done on a mill at approximately 120° F.

| Stock | Z | AA | BB | CC | DD | EE |
|---|---|---|---|---|---|---|
| Masterbatch | 181 | 181 | 181 | 181 | 181 | 181 |
| Ferric dimethyldithiocarbamate | 1.5 | 1.5 | 1.5 | 1.5 | 1.5 | 1.5 |
| Sulfur | 1.5 | 1.5 | 1.5 | 1.5 | 1.5 | 1.5 |
| Mercaptobenzothiazole | | 0.5 | | | | |
| Zinc salt of mercaptobenzothiazole | | | 0.5 | | | |
| Benzothiazolyl disulfide | | | | 0.5 | | |
| N-cyclohexyl-2-benzothiazole-sulfenamide | | | | | 0.5 | |
| N-oxydiethylene-2-benzothiazole-sulfenamide | | | | | | 0.5 |

Portions of each of these were cured at 292° F. and 320° F. The results are summarized in the table below.

| | Mins. cured | Stock Z | Stock AA | Stock BB | Stock CC | Stock DD | Stock EE |
|---|---|---|---|---|---|---|---|
| Cured at 292°F.: | | | | | | | |
| 300% modulus, p.s.i | 15 | 200 | 350 | 240 | 390 | 380 | 390 |
| | 30 | 380 | 720 | 550 | 780 | 700 | 750 |
| Tensile, p.s.i | 15 | 450 | 1,250 | 750 | 1,300 | 1,100 | 1,050 |
| | 30 | 1,350 | 2,780 | 2,120 | 2,850 | 2,540 | 2,620 |
| Elongation, Percent | 15 | 605 | 630 | 650 | 635 | 610 | 610 |
| | 30 | 635 | 635 | 670 | 635 | 625 | 640 |
| Cured at 320° F.: | | | | | | | |
| 300% Modulus, p.s.i | 15 | 930 | 1,180 | 1,050 | 1,170 | 1,130 | 1,090 |
| Tensile, p.s.i | 15 | 2,807 | 3,600 | 3,520 | 3,620 | 3,210 | 3,420 |
| Elongation, Percent | 15 | 610 | 610 | 620 | 600 | 580 | 600 |

These results show that all of these mercaptobenzothiazole derivatives possess activity as secondary accelerators for ferric dimethyldithiocarbamate and any one of them can be used with this dithiocarbamate to give the improved cure rate.

Example 8

This example illustrates the use of ferric diethyl, di-n-propyl, and di-n-butyldithiocarbamates and compares them with the corresponding zinc dithiocarbamates and with the ferric and zinc dimethyldithiocarbamates. A masterbatch was prepared as described in Example 1 and portions of this were then used to prepare the following stocks, the mixing being done on a mill at 120° F.

| Stock | FF | GG | HH | II | JJ | KK | LL | MM |
|---|---|---|---|---|---|---|---|---|
| Masterbatch | 181 | 181 | 181 | 181 | 181 | 181 | 181 | 181 |
| Sulfur | 1.5 | 1.5 | 1.5 | 1.5 | 1.5 | 1.5 | 1.5 | 1.5 |
| Mercaptobenzothiazole | 0.5 | 0.5 | 0.5 | 0.5 | 0.5 | 0.5 | 0.5 | 0.5 |
| Ferric dimethyl dithiocarbamate | 1.5 | | | | | | | |
| Zinc dimethyl dithiocarbamate | | 1.5 | | | | | | |
| Ferric diethyl dithiocarbamate | | | 1.5 | | | | | |
| Zinc diethyl dithiocarbamate | | | | 1.5 | | | | |
| Ferric di-n-propyl dithiocarbamate | | | | | 1.5 | | | |
| Zinc di-n-propyl dithiocarbamate | | | | | | 1.5 | | |
| Ferric di-n-butyl dithiocarbamate | | | | | | | 1.5 | |
| Zinc di-n-butyl dithiocarbamate | | | | | | | | 1.5 |

These stocks were cured at 292° F. and 320° F. The results of the stress-strain tests are given in the following table.

| | Mins. cured | Stock FF | Stock GG | Stock HH | Stock II | Stock JJ | Stock KK | Stock LL | Stock MM |
|---|---|---|---|---|---|---|---|---|---|
| Cured at 292° F.: | | | | | | | | | |
| 300% modulus, p.s.i | 15 | 600 | 400 | 600 | 550 | 620 | 430 | 380 | 300 |
| | 30 | 1,200 | 720 | 1,150 | 1,150 | 900 | 900 | 780 | 650 |
| | 45 | 1,780 | 1,080 | 1,500 | 1,500 | 1,200 | 1,120 | 1,110 | 900 |
| Tensile, p.s.i | 15 | 1,680 | 780 | 1,800 | 1,350 | 1,600 | 1,110 | 940 | 700 |
| | 30 | 3,250 | 2,240 | 3,280 | 3,130 | 2,670 | 2,430 | 2,390 | 2,200 |
| | 45 | 2,800 | 2,950 | 3,040 | 3,240 | 3,100 | 2,690 | 3,090 | 3,020 |
| Elongation, Percent | 15 | 590 | 600 | 610 | 560 | 460 | 630 | 600 | 590 |
| | 30 | 560 | 600 | 560 | 590 | 590 | 550 | 610 | 630 |
| | 45 | 440 | 530 | 460 | 500 | 560 | 490 | 550 | 620 |
| Cured at 320° F.: | | | | | | | | | |
| 300% modulus, p.s.i | 5 | 400 | 300 | 380 | 340 | 400 | 300 | 260 | 200 |
| | 15 | 1,150 | 1,070 | 1,180 | 990 | 980 | 800 | 750 | 700 |
| Tensile, p.s.i | 5 | 850 | 600 | 830 | 700 | 980 | 650 | 570 | 390 |
| | 15 | 3,100 | 2,700 | 3,050 | 2,950 | 2,600 | 2,300 | 2,410 | 2,330 |
| Elongation, Percent | 5 | 560 | 560 | 570 | 550 | 570 | 620 | 590 | 620 |
| | 15 | 520 | 550 | 550 | 590 | 600 | 560 | 620 | 610 |

These data show that with the diethyl, di-n-propyl, and di-n-butyldithiocarbamates the advantage of the ferric over the zinc compounds is still present, although less than with the ferric dimethyl versus the zinc dimethyldithiocarbamate.

Example 9

This example shows that the ferric and zinc di-methyldithiocarbamates are much superior to the ferric and zinc morpholine carbodithioates as accelerators of the cure of the ethylene-propylene-dicyclopentadiene terpolymer. A masterbatch was prepared by mixing in a Banbury 100 parts of the same type of terpolymer as was used in Example 1 with 50 parts of high abrasion furnace carbon black, 25 parts of a naphthenic type softener oil, 5 parts of zinc oxide, and 1 part of stearic acid. Portions of this were then used to prepare the following stocks, the mixing being done on a mill at about 120° F.

| Stock | NN | OO | PP | QQ |
|---|---|---|---|---|
| Masterbatch | 181 | 181 | 181 | 181 |
| Mercaptobenzothiazole | 0.5 | 0.5 | 0.5 | 0.5 |
| Sulfur | 1.5 | 1.5 | 1.5 | 1.5 |
| Ferric morpholine carbodithioate | 1.5 | | | |
| Zinc morpholine carbodithioate | | 1.5 | | |
| Ferric dimethyl dithiocarbamate | | | 1.5 | |
| Zinc dimethyl dithiocarbamate | | | | 1.5 |

These stocks were cured at 292° F. The results are summarized in the table below.

| | Mins. cured | Stock NN | Stock OO | Stock PP | Stock QQ |
|---|---|---|---|---|---|
| 300% modulus, p.s.i. | 15 | 40 | 70 | 710 | 390 |
| | 30 | 140 | 110 | 1,080 | 660 |
| | 45 | 200 | 210 | 1,340 | 980 |
| Tensile, p.s.i. | 15 | 90 | 70 | 2,590 | 1,060 |
| | 30 | 280 | 240 | 3,040 | 2,600 |
| | 45 | 580 | 550 | 2,960 | 3,010 |
| Elongation, Percent | 5 | 570 | 590 | 640 | 640 |
| | 30 | 680 | 670 | 540 | 670 |
| | 45 | 680 | 700 | 480 | 580 |

It is very evident from this data that the two morpholine carbodithioates are poor accelerators since very little cure was obtained in stocks NN and OO.

*Example 10*

This example shows the comparison of ferric dimethyldithiocarbamate to the cobalt, nickel, cupric, mercuric, chromium, arsenic, and antimony dimethyldithiocarbamates as accelerators for EPT. A masterbatch was prepared in the same way as the one in Example 1 and portions of this were used to prepare the following stocks, the mixing being done on a mill at approximately 120° F.

| Stock | RR | SS | TT | UU | VV | WW | XX | YY | ZZ |
|---|---|---|---|---|---|---|---|---|---|
| Masterbatch | 181 | 181 | 181 | 181 | 181 | 181 | 181 | 181 | 181 |
| Mercaptobenzothiazole | 0.5 | 0.5 | 0.5 | 0.5 | 0.5 | 0.5 | 0.5 | 0.5 | 0.5 |
| Sulfur | 1.5 | 1.5 | 1.5 | 1.5 | 1.5 | 1.5 | 1.5 | 1.5 | 1.5 |
| Dimethyldithiocarbamate: | | | | | | | | | |
| Cobalt | 1.5 | | | | | | | | |
| Nickel | | 1.5 | | | | | | | |
| Cupric | | | 1.5 | | | | | | |
| Mercuric | | | | 1.5 | | | | | |
| Chromium | | | | | 1.5 | | | | |
| Arsenic | | | | | | 1.5 | | | |
| Antimony | | | | | | | 1.5 | | |
| Ferric | | | | | | | | 1.5 | |
| Zinc | | | | | | | | | 1.5 |

These stocks were cured at 292° F. and 320° F. The results are summarized in the following table.

| | Mins. cured | Stock RR | Stock SS | Stock TT | Stock UU | Stock VV | Stock WW | Stock XX | Stock YY | Stock ZZ |
|---|---|---|---|---|---|---|---|---|---|---|
| Cured at 292° F.: | | | | | | | | | | |
| 300% modulus, p.s.i. | 15 | (*) | (*) | 180 | 220 | 220 | 390 | 460 | 700 | 380 |
| | 30 | (*) | (*) | 250 | 640 | 560 | 820 | 710 | 1,180 | 650 |
| Tensile, p.s.i. | 15 | (*) | (*) | 220 | 390 | 540 | 790 | 1,180 | 2,190 | 790 |
| | 30 | (*) | (*) | 590 | 1,980 | 1,980 | 2,240 | 2,180 | 2,950 | 2,170 |
| Elongation, percent | 15 | (*) | (*) | 640 | 575 | 640 | 525 | 575 | 635 | 595 |
| | 30 | (*) | (*) | 635 | 640 | 685 | 590 | 605 | 535 | 675 |
| Cured at 320° F.: | | | | | | | | | | |
| 300% modulus, p.s.i. | 5 | 40 | 50 | 90 | 170 | 190 | 300 | 290 | 460 | 240 |
| | 10 | 40 | 50 | 220 | 430 | 300 | 490 | 840 | 900 | 580 |
| Tensile, p.s.i. | 5 | 50 | 100 | 190 | 230 | 390 | 820 | 810 | 1,720 | 820 |
| | 10 | 60 | 100 | 630 | 1,420 | 1,590 | 1,820 | 1,970 | 3,200 | 2,300 |
| Elongation, percent | 5 | 385 | 535 | 620 | 565 | 615 | 580 | 590 | 670 | 620 |
| | 10 | 690 | 715 | 635 | 650 | 675 | 640 | 665 | 635 | 685 |

*No cure.

These data show that the ferric dimethyldithiocarbamate develops cure at a faster rate than any of the other dithiocarbamates.

*Example 11*

This example shows the effectiveness of ferric dimethyldithiocarbamate as an accelerator in a non-black loaded stock and compares it with zinc dimethyldithiocarbamate and with tetramethylthiuram monosulfide as accelerators in such a stock. A masterbatch was prepared by mixing in a Banbury 100 parts of the same type of EPT elastomer as used in Example 1, 100 parts of white clay, 20 parts of titanium dioxide, 30 parts of the softener oil used in Example 1, 5 parts of zinc oxide and 1 part of stearic acid. Portions of this were then used to prepare the following stocks, the mixing being done on a mill at approximately 120° F.

| Stock | $A_1$ | $B_1$ | $C_1$ |
|---|---|---|---|
| Masterbatch | 256 | 256 | 256 |
| Sulfur | 1.5 | 1.5 | 1.5 |
| Mercaptobenzothiazole | 0.5 | 0.5 | 0.5 |
| Ferric dimethyldithiocarbamate | 1.5 | | |
| Zinc dimethyldithiocarbamate | | 1.5 | |
| Tetramethylthiuram monosulfide | | | 1.5 |

These stocks were cured at 292° F. and 320° F. The results are given in the table below.

| | Mins. cured | Stock $A_1$ | Stock $B_1$ | Stock $C_1$ |
|---|---|---|---|---|
| Cured at 292° F.: | | | | |
| 300% modulus, p.s.i. | 15 | 190 | 180 | 90 |
| | 30 | 250 | 220 | 220 |
| | 45 | 420 | 260 | 300 |
| Tensile, p.s.i. | 15 | 300 | 190 | 100 |
| | 30 | 940 | 420 | 500 |
| | 45 | 890 | 700 | 840 |
| Elongation, percent | 15 | 880 | 775 | 810 |
| | 30 | 860 | 940 | 925 |
| | 45 | 675 | 925 | 875 |
| Cured at 320° F.: | | | | |
| 300% modulus, p.s.i. | 10 | 220 | 180 | 210 |
| | 15 | 290 | 230 | 300 |
| Tensile, p.s.i. | 10 | 640 | 390 | 480 |
| | 15 | 970 | 660 | 870 |
| Elongation, percent | 10 | 910 | 910 | 940 |
| | 15 | 780 | 880 | 810 |

These results show that in a clay loaded stock the ferric dimethyldithiocarbamate, used as the primary accelerator, will develop a high tensile more rapidly than will zinc dimethyldithiocarbamate or tetramethylthiuram monosulfide.

*Example 12*

This example shows that ferric dimethyldithiocarbamate as the sole accelerator is more effective than zinc dimethyldithiocarbamate. A masterbatch was prepared as described in Example 1 and portions of this were used to prepare the following stocks, the mixing being done on a mill at approximately 120° F.

| Stock | D₁ | E₁ | F₁ | G₁ | H₁ | I₁ |
|---|---|---|---|---|---|---|
| Masterbatch | 181 | 181 | 181 | 181 | 181 | 181 |
| Sulfur | 1.5 | 1.5 | 1.5 | 1.5 | 1.5 | 1.5 |
| Ferric dimethyldithiocarbamate | 0.75 | 1.5 | 2.5 | | | |
| Zinc dimethyldithiocarbamate | | | | 0.75 | 1.5 | 2.5 |

These stocks were cured at 292° F. The results of the stress-strain tests are given in the following table.

| | Mins. cured | Stock D₁ | Stock E₁ | Stock F₁ | Stock G₁ | Stock H₁ | Stock I₁ |
|---|---|---|---|---|---|---|---|
| 300% modulus, p.s.i. | 15 | 190 | 190 | 230 | 180 | 120 | 100 |
| | 30 | 440 | 400 | 500 | 320 | 300 | 250 |
| | 60 | 790 | 790 | 950 | 750 | 690 | 640 |
| Tensile, p.s.i. | 15 | 500 | 490 | 690 | 320 | 290 | 220 |
| | 30 | 1,580 | 1,580 | 1,890 | 1,130 | 1,080 | 1,050 |
| | 60 | 3,100 | 3,040 | 2,920 | 2,850 | 2,800 | 2,700 |
| Elongation, percent | 15 | 685 | 680 | 635 | 650 | 600 | 750 |
| | 30 | 665 | 670 | 655 | 690 | 680 | 715 |
| | 60 | 655 | 610 | 595 | 680 | 680 | 670 |

These data show that satisfactory cures can be obtained with stocks containing no thiazole, and that the ferric dimethyldithiocarbamate is better than the zinc dimethyldithiocarbamate over a range of concentrations.

*Example 13*

The EPT used in the other examples has been the one containing dicyclopentadiene as the diene. The present example illustrates the use of an EPT made with 1,4-hexadiene as the diene monomer, and another EPT made with methylene norbornylene. A masterbatch was made by mixing in the Banbury 100 parts of 1,4-hexadiene terpolymer, 5 parts of zinc oxide, 50 parts of high abrasion furnace black, and 20 parts of naphthenic type softener oil. A second masterbatch was prepared except that 100 parts of methylene norbornylene EPT were used. Portions of each of these were then used to prepare stocks according to the following table, the mixing being done on a mill at approximately 120° F.

| Stock | J₁ | K₁ | L₁ | M₁ |
|---|---|---|---|---|
| Masterbatch #1 (1,4-hexadiene EPT) | 180 | 180 | | |
| Masterbatch #2 (methylene norbornylene EPT) | | | 180 | 180 |
| Stearic Acid | 1.0 | 1.0 | 1.0 | 1.0 |
| Sulfur | 1.5 | 1.5 | 1.5 | 1.5 |
| Mercaptobenzothiazole | 0.5 | 0.5 | 0.5 | 0.5 |
| Ferric dimethyldithiocarbamate | 1.5 | | 1.5 | |
| Zinc dimethyldithiocarbamate | | 1.5 | | 1.5 |

The stocks were then cured at 320° F. The results of the stress-strain tests are given in the table below.

| | Mins. cured | Stock J₁ | Stock K₁ | Stock L₁ | Stock M₁ |
|---|---|---|---|---|---|
| 300% modulus, lbs./sq. in. | 3 | 200 | 200 | 700 | 380 |
| | 5 | 420 | 300 | 1,100 | 580 |
| | 7.5 | 870 | 570 | 1,460 | 850 |
| Tensile, lbs./sq. in. | 3 | 2,450 | 1,450 | 2,880 | 1,380 |
| | 5 | 3,500 | 2,980 | 3,170 | 2,450 |
| | 7.5 | 3,640 | 3,500 | 3,100 | 2,950 |
| Elongation, percent | 3 | 1,000 | 1,000 | 770 | 880 |
| | 5 | 870 | 960 | 590 | 770 |
| | 7.5 | 730 | 790 | 530 | 700 |

These results show that in stocks prepared from terpolymers containing dienes other than dicyclopentadiene, namely 1,4-hexadiene or methylene norbornylene, ferric dimethyldithiocarbamate gives a faster cure than does zinc dimethyldithiocarbamate.

*Example 14*

In order to determine the effect of stearic acid on the activity of the two accelerators ferric and zinc dimethyldithiocarbamate a series of tests were run using 0, 0.1, 0.5, 1.0, and 2.0 parts of stearic acid (using the EPT composition of Example 1). It was found that when less than 1.0 part of stearic acid was used raw the ferric compound was less active than the zinc compound but when 1.0 or 2.0 parts were used the ferric compound was definitely superior. To show this the tensiles of the cures at 320° F. are tabulated below.

| Mins. cured | Nil Zn | Nil Fe | 0.1 Zn | 0.1 Fe | 0.5 Zn | 0.5 Fe | 1.0 Zn | 1.0 Fe | 2.0 Zn | 2.0 Fe |
|---|---|---|---|---|---|---|---|---|---|---|
| 5 | 890 | 200 | 790 | 200 | 800 | 520 | 800 | 1,270 | 820 | 1,000 |
| 7.5 | 2,140 | 530 | 1,950 | 720 | 1,700 | 1,210 | 1,540 | 2,550 | 1,710 | 2,150 |
| 10 | 2,810 | 1,390 | 2,660 | 1,380 | 2,900 | 2,300 | 2,920 | 3,580 | 2,960 | 3,330 |

It appears that the stearic acid activates the ferric dimethyldithiocarbamate while retarding the zinc dithiocarbamate. It should be noted that in this series the best that the zinc compound could do is still short of the results with the ferric compound with 1.0 stearic acid.

Having thus described my invention, what I claim and desire to protect by Letters Patent is:

1. A method of curing unsaturated rubbery copolymer of ethylene, a different alpha-monoolefin, and at least one copolymerizable non-conjugated diene, said copolymer containing from 1 to 25% by weight of said diene, comprising subjecting to vulcanizing conditions a composition comprising the said copolymer, sulfur, a ferric dialkyldithiocarbamate in which the alkyl groups contain 1 to 4 carbon atoms as a primary accelerator, zinc oxide, a fatty acid having from 10 to 20 carbon atoms, and, as a secondary accelerator, a thiazole selected from the group consisting of 2-mercaptobenzothiazole, zinc salt of 2-mercaptobenzothiazole, 2-benzothiazolyl disulfide, and 2-benzothiazolesulfenamides, the proportions of said ingredients being, by weight, per 100 parts of said copolymer: 0.1 to 10 parts of sulfur, 0.5 to 5 parts of ferric dialkyldithiocarbamate, 1.0 to 5 parts of fatty acid, 0.2 to 5 parts of zinc oxide, and up to 2 parts of thiazole accelerator.

2. A method of curing unsaturated rubbery terpolymer of ethylene, a different alpha-monoolefin, and a copolymerizable non-conjugated diene, said terpolymer containing from 2 to 15% by weight of said diene, comprising subjecting to vulcanizing conditions a composition comprising the said terpolymer, sulfur, a ferric dialkyldithiocarbamate in which the alkyl groups contain 1 to 4 carbon atoms as a primary accelerator, zinc oxide, stearic acid, and, as a secondary accelerator, a thiazole selected from the group consisting of 2-mercaptobenzothiazole, zinc salt of 2-mercaptobenzothiazole, 2-benzothiazolyl disulfide and 2-benzothiazolesulfenamides, the proportions of said ingredients being, by weight, per 100 parts of said terpolymer: 0.1 to 10 parts of sulfur, 0.5 to 5 parts of ferric dialkyldithiocarbamate, 1.0 to 5 parts of stearic acid, 0.2 to 5 parts of zinc oxide, and up to 2 parts of thiazole accelerator.

3. A method comprising heating at a temperature of 250° to 400° F. for 1 minute to 2 hours a composition comprising, by weight, 100 parts unsaturated rubbery terpolymer of ethylene, propylene and a copolymerizable non-conjugated diene, the said terpolymer containing from 2 to 15% by weight of said diene, 0.1 to 5 parts of a ferric dialkyldithiocarbamate in which the alkyl groups contain from 1 to 4 carbon atoms, 0.1 to 10 parts sulfur, 1.0 to 5 parts stearic acid, 0.2 to 5 parts zinc oxide, and up to 2 parts of a thiazole accelerator selected from the group consisting of 2-mercaptobenzothiazole, zinc salt of 2-mercaptobenzothiazole, 2-benzothiazolyl disulfide and 2-benzothiazolesulfenamides.

4. A method as in claim 3 in which the said alkyl group is methyl.

5. A method as in claim 3 in which the said alkyl group is ethyl.

6. A vulcanizable composition comprising unsaturated ethylene-propylene-copolymerizable diene rubber the said diene being non-conjugated and being present in the rubber in amount of from 2 to 15% by weight of the rubber, sulfur, a ferric dialkyldithiocarbamate in which the alkyl group contains 1 to 4 carbon atoms, stearic acid, zinc oxide, and, as a secondary accelerator, a thiazole selected from the group consisting of 2-mercaptobenzothiazole, zinc salt of 2-mercaptobenzothiazole, 2-benzothiazolyl disulfide and 2-benzothiazolesulfenamides, the proportions of said ingredients being, by weight, per 100 parts of said rubber: 0.1 to 10 parts of sulfur, 0.1 to 5 parts of ferric dialkyldithiocarbamate, 1.0 to 5 parts of stearic acid, 0.2 to 5 parts of zinc oxide, and up to 2 parts of thiazole accelerator.

7. A vulcanizable composition comprising unsaturated ethylene-propylene-dicyclopentadiene terpolymer rubber containing from 2 to 15% by weight of dicyclopentadiene, sulfur, a ferric dialkyldithiocarbamate in which the alkyl group contains 1 to 4 carbon atoms, stearic acid, zinc oxide, and a thiazole accelerator selected from the group consisting of 2-mercaptobenzothiazole, zinc salt of 2-mercaptobenzothiazole, 2-benzothiazolyl disulfide, and 2-benzothiazole-sulfenamides, the proportions of said ingredients being, by weight, per 100 parts of said rubber: 0.1 to 10 parts of sulfur, 0.1 to 5 parts of ferric dialkyldithiocarbamate, 1.0 to 5 parts of stearic acid, 0.2 to 5 parts of zinc oxide, and up to 2 parts of thiazole accelerator.

8. A vulcanizate derived from a composition comprising unsaturated ethylene-propylene-copolymerizable diene rubber the said diene being non-conjugated and being present in the rubber in amount of from 2 to 15% by weight of the rubber, sulfur, a ferric dialkyldithiocarbamate in which the alkyl group contains 1 to 4 carbon atoms, stearic acid, zinc oxide, and, as a secondary accelerator, a thiazole selected from the group consisting of 2-mercaptobenzothiazole, zinc salt of 2-mercaptobenzothiazole, 2-benzothiazolyl disulfide and 2-benzothiazolesulfenamides, the proportions of said ingredients being, by weight, per 100 parts of said rubber: 0.1 to 10 parts of sulfur, 0.1 to 5 parts of ferric dialkyldithiocarbamate, 1.0 to 5 parts of stearic acid, 0.2 to 5 parts of zinc oxide, and up to 2 parts of thiazole accelerator.

9. A vulcanizate as in claim 8 in which the rubber is a copolymer of ethylene, propylene and dicyclopentadiene.

10. A vulcanizate as in claim 8 in which the rubber is a copolymer of ethylene, propylene and 1,4-hexadiene.

11. A vulcanizate as in claim 8 in which the rubber is a copolymer of ethylene, propylene and methylene norbornylene.

12. A vulcanizate as in claim 8 in which the said alkyl group is methyl.

13. A vulcanizate as in claim 8 in which the said alkyl group is ethyl.

References Cited

UNITED STATES PATENTS

| | | | |
|---|---|---|---|
| 2,283,336 | 5/1942 | Neal et al. | 260—786 |
| 2,631,984 | 3/1953 | Crawford et al. | 260—80.7 |
| 2,933,480 | 4/1960 | Gresham et al. | 260—80.5 |
| 3,000,866 | 9/1961 | Tarney | 260—79.5 |
| 3,023,195 | 2/1962 | Martin et al. | 260—79.5 |
| 3,093,620 | 6/1963 | Gladding et al. | 260—79.5 |
| 3,093,621 | 6/1963 | Gladding | 260—79.5 |
| 3,278,480 | 10/1966 | Radcliff et al. | 260—41 |

FOREIGN PATENTS

33/5434 1958 Japan.

OTHER REFERENCES

Wolf et al.: India Rubber World, May 1949, p. 191.

DONALD E. CZAJA, *Primary Examiner.*

LEON J. BERCOVITZ, *Examiner.*

R. A. WHITE, *Assistant Examiner.*